United States Patent
Masaki et al.

(10) Patent No.: US 6,980,308 B2
(45) Date of Patent: Dec. 27, 2005

(54) APPARATUS AND METHOD FOR IMAGE PROCESSING AND PRINT SYSTEM FOR PREVENTING FORGERY

(75) Inventors: Kenji Masaki, Nagaokakyo (JP); Hirotomo Ishii, Toyonaka (JP); Chiho Kawakami, Tondabayashi (JP)

(73) Assignee: Minolta Co., Ltd., Osaka (JP)

( * ) Notice: Subject to any disclaimer, the term of this patent is extended or adjusted under 35 U.S.C. 154(b) by 895 days.

(21) Appl. No.: 09/880,964

(22) Filed: Jun. 15, 2001

(65) Prior Publication Data
US 2002/0054315 A1 May 9, 2002

(30) Foreign Application Priority Data
Jun. 15, 2000 (JP) .............................. 2000-180056

(51) Int. Cl.[7] .......................................... G03G 21/04
(52) U.S. Cl. ...................... 358/1.14; 382/181; 399/366
(58) Field of Search ...................... 358/1.14; 382/135, 382/137, 181; 399/366, 367, 373, 388

(56) References Cited

U.S. PATENT DOCUMENTS

| | | | |
|---|---|---|---|
| 5,410,471 A | * | 4/1995 | Alyfuku et al. ............. 600/300 |
| 5,621,810 A | | 4/1997 | Suzuki et al. |
| 5,659,628 A | * | 8/1997 | Tachikawa et al. ......... 382/135 |
| 6,108,098 A | * | 8/2000 | Owada et al. ............. 358/1.14 |
| 6,249,658 B1 | * | 6/2001 | Inui et al. ..................... 399/82 |
| 6,272,248 B1 | * | 8/2001 | Saitoh et al. ............... 382/218 |
| 6,687,017 B1 | * | 2/2004 | Kakiuchi et al. .......... 358/1.14 |

FOREIGN PATENT DOCUMENTS

| | | |
|---|---|---|
| EP | 1 017 226 | 7/2000 |
| JP | 07-023218 | 1/1995 |
| JP | 2951665 | 7/1999 |

* cited by examiner

*Primary Examiner*—King Y. Poon
*Assistant Examiner*—Lucas Divine
(74) *Attorney, Agent, or Firm*—Buchanan Ingersoll PC (57) ABSTRACT

In an image processor in a print system, an output device processes input data and outputs the processed data, while a detector detects whether data of a specified pattern is included in the input data or in the processed data, in parallel to the data processing by the output device. A stop controller makes the output device stop to output the processed data at an irregular timing after the detector detects the specified pattern. The printer prints an image on a sheet of paper, based on the data outputted by the output device. Thus when the specified pattern in an image is detected, the printing is stopped but the stop position becomes irregular.

12 Claims, 9 Drawing Sheets

APPARATUS AND METHOD FOR IMAGE PROCESSING AND PRINT SYSTEM FOR PREVENTING FORGERY

This application is based on application No. 2000-180056 filed in Japan, the contents of which are hereby incorporated by reference.

BACKGROUND OF THE INVENTION

1. Field of the Invention

The present invention relates to image processing for preventing forgery of paper money, securities and the like.

2. Description of Prior Art

Recently, a peripheral of a computer such as a scanner or a color printer has improved functions and higher performance, and a possibility is increased that an average consumer can copy paper money, securities and the like easily. Then, effective countermeasures for preventing forgery have been developed. One of methods for preventing forgery is to include a specified pattern in a design of paper money or the like. The specified pattern is embedded in an image so as not to be noticed by a user in the standpoint of prevention of forgery. Image data is analyzed before printing, and when the specified pattern is detected in the image data, normal print operation is stopped.

When an image is printed based on input image data, the detection of the specified pattern is performed in parallel to the printing of the image. That is, while the input image data is subjected to predetermined image processing and is sent to the printer, the input image data is in parallel subjected to the detection of whether the specified pattern is included or not. When the specified pattern is detected, the transmission of image data to the printer is stopped, and the printing is interrupted. In this case, when the printing is interrupted according to the detection of the specified pattern, the printing of the entire image is prevented, but the printing is already started. Thus a part of the image has already been printed. Therefore, when the print operation is stopped by stopping the transmission of image data to the printer just when the specified pattern is detected, the printing is stopped just after the position of the specified pattern included in the image. Therefore, it is liable that the position of the specified pattern in the image may be estimated based on the stop potion of the printing. Therefore, this is not favorable for the prevention of forgery.

SUMMARY OF THE INVENTION

An object of the present invention is to make it difficult to estimate a position of a specified pattern in an output image.

A print system according to the invention includes an image processor and a printer which prints data received from the image processor. In the image processor, an output device processes input data and outputs the processed data, while a detector detects whether data of a specified pattern is included in the input data or in the processed data, in parallel to the data processing by the output device. Further, a stop controller makes the output device stop to output the processed data at an irregular timing after the detector detects the specified pattern. The printer prints an image on a sheet of paper, based on the data outputted by the output device. Thus the stop position in the printing becomes irregular when the specified pattern in an image is detected.

An advantage of the present invention is that the identification of the position of the specified pattern in an mage becomes difficult.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
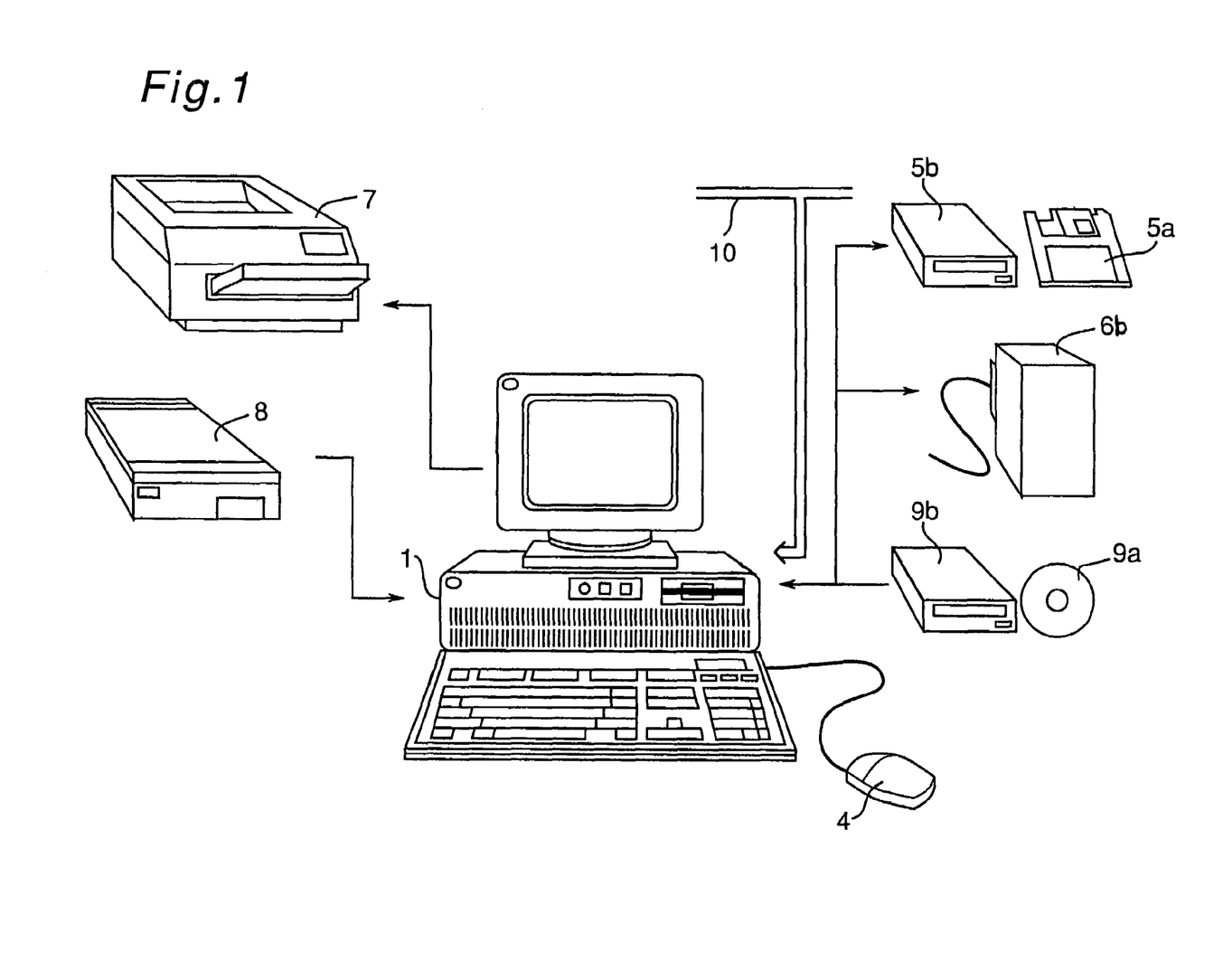
FIG. 1 is a diagram of an image processing system.

Referring now to the drawings, wherein like reference characters designate like or corresponding parts throughout the several views, FIG. 1 shows a print system. In this system, in order to prevent forgery, a specified image (shape) or a specified pattern is detected in input image data or in data obtained by predetermined processing on the input image data. When the specified image or pattern is detected, the image data is inhibited to be outputted. A computer 1 controls the entire system. The computer 1 has a central processing unit (CPU), a read-only memory (ROM) and a random access memory (RAM). Further, it has a flexible disk drive 5b, a hard disk drive 6b, and a CD-ROM drive 9b for memory media of a flexible disk 5a, a hard disk and a CD-ROM 9a. An image processing program explained later is read from such a recording medium. The computer 1 is also connected to a scanner 8 as an image input unit for acquiring image data and a printer 7 as an image output unit for outputting the image data. Further, the computer 1 can be connected to a different image input unit or a different image output unit through a network 10. The above-mentioned system structure is common to other embodiments explained later.

Figure 2:
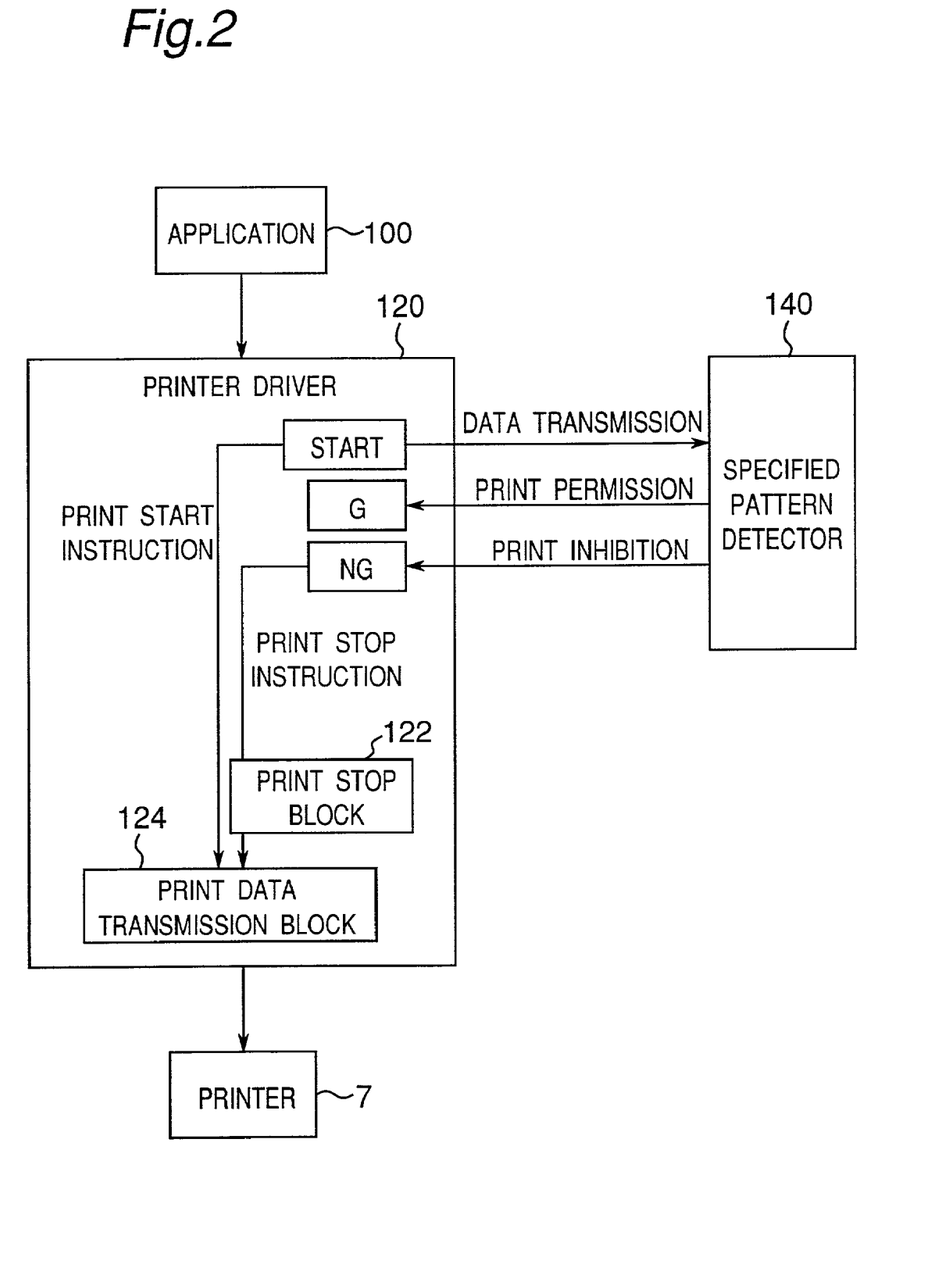
FIG. 2 is a diagram of a flow of print data processing.

FIG. 2 shows a flow of print data processing. In the image output system, the computer 1 has a printer driver 120 and a specified pattern detector 140. The printer driver 120 is a component in a computer program which outputs data including image data in the computer 1 to the printer 7. Practically, when data is edited or confirmed by an application 100, it is sent to the printer driver 120. Then, the printer driver 120 converts the data according to the printer characteristics and sends print data to the printer 7.

FIG. 2 shows the processing in the printer driver 120 is shown as functional blocks. The printer driver 120 has a print stop block 122 and a print data transmission block 124, in order to control the stop operation. Data as an object for prevention of forgery is image data. As to input image data received from the image input unit, when an application 100 in the computer instructs printing of the as-received image data or data obtained by predetermined processing on the image data, the image data is sent via the printer driver 120 to the printer and is printed thereby. In order to prevent forgery, the computer 1 further has a specified pattern detector 140. When the printer driver 120 receives a print start instruction from the application 100, it sends the data by the print data transmission block 124 to the printer 7. In parallel, the printer driver 120 sends the input image data also to the specified pattern detector 140. When the specified pattern detector 140 does not detect a specified pattern, it sends a print permission command to the printer driver 120. On the contrary, when the detector 140 detects a specified pattern, it sends a print inhibition command to the printer driver 120. When the print stop block 122 receives the print inhibition command, it sends a print stop instruction at a random timing to the print data transmission block 124 in order to stop the transmission of print data.

Figure 3:
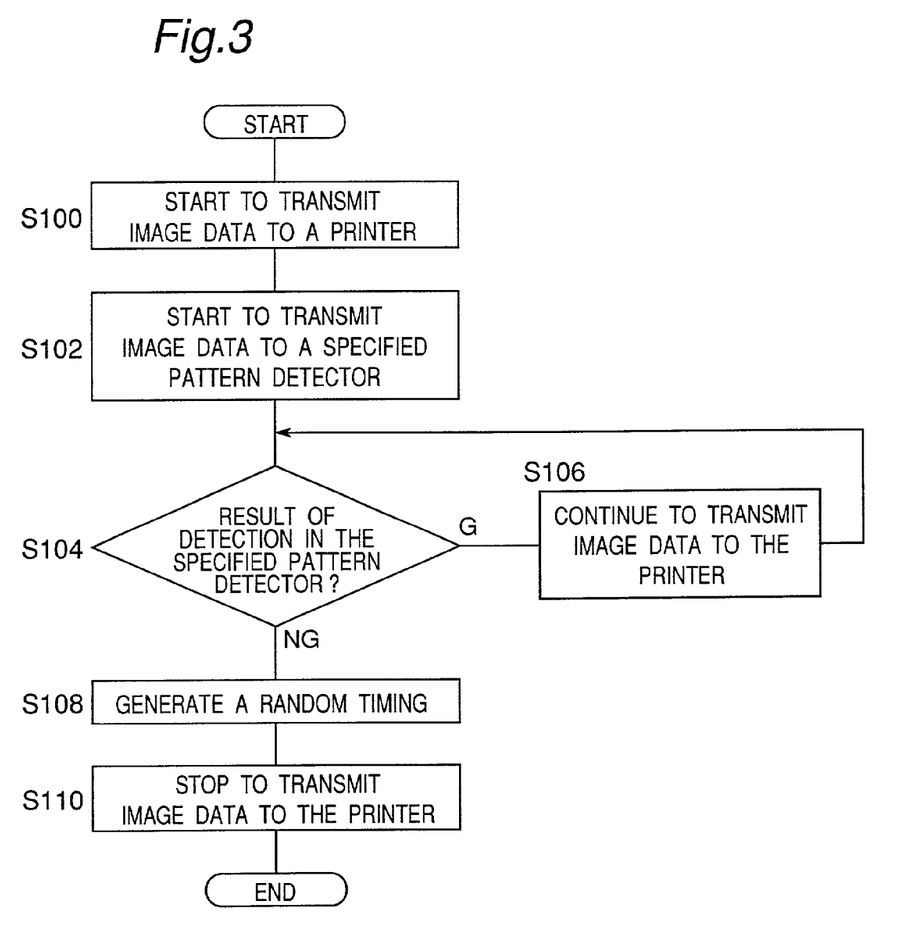
FIG. 3 is a flowchart of a printer driver in a first embodiment.

FIG. 3 shows a flow of the processing in the printer driver 120. When a print start instruction is received from the application 100, transmission of image data to the printer 7 is started (S100), and transmission of image data to the specified pattern detector 140 in parallel is also started (S102). A print inhibition command or a print permission command is sent from the specified pattern detector 140 according as a specified pattern is detected or not. Then, the result of the detection in the specified pattern detector 140 is decided (S104), and if the print permission command is received, the transmission of image data to the printer 7 is continued (S106). On the other hand, if the print inhibition command is received, a print stop instruction is sent to the print stop block 122 to generate a random timing (S108), and the transmission of the image data to the printer 7 is stopped at the timing (S110). Therefore, when a print inhibition command from the specified pattern detector 140 is received, a stop instruction is sent to the data transmission block 124 after an irregular time "t" elapses. It is desirable that the time "t" is longer than one second and shorter than one minute. Therefore, the time between the detection of the specified pattern and stop of print operation of the printer is changed randomly. By stopping the printing at a random position as explained above, it can be avoided to suggest a position of the specified pattern based on the print stop position.

Figure 4:
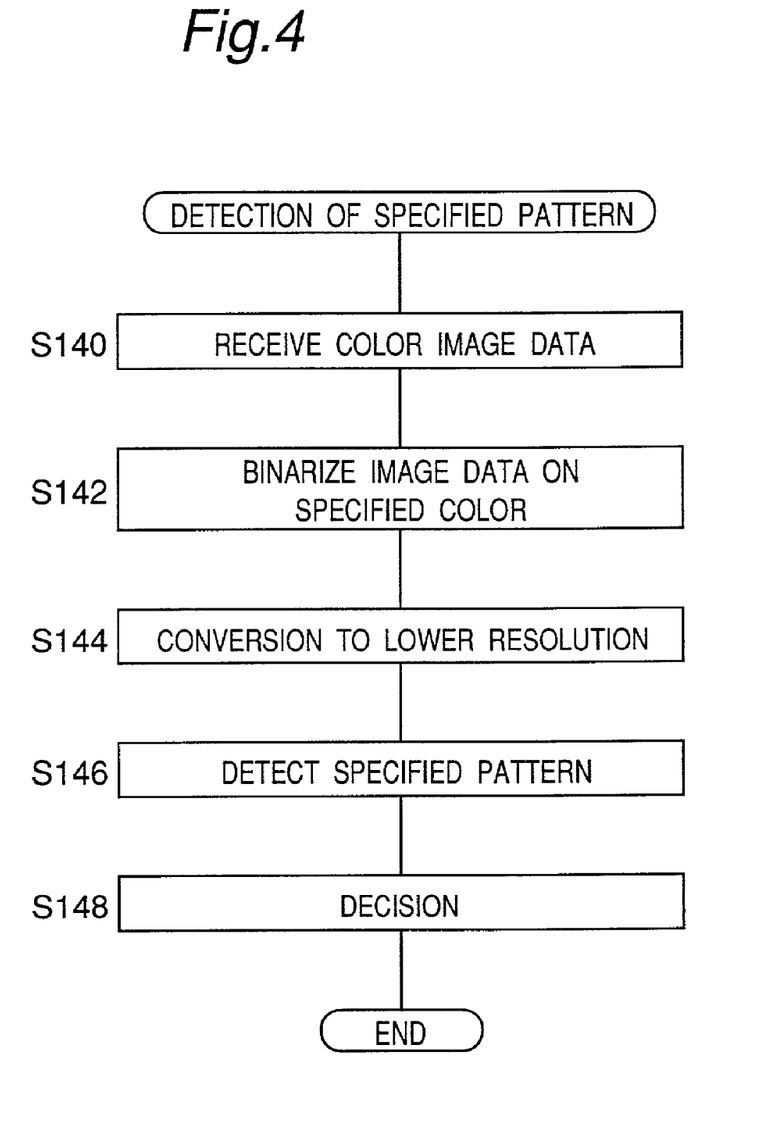
FIG. 4 is a flowchart of detection of specified pattern of a specified pattern detector.

FIG. 4 shows an example of the detection of a specified pattern in the detector 140. First, a multi-level color image as an object of the detection is received (S140). Next, the color image is binarized (S142). In the binarization of color image, if R (red), G (green) and B (blue) values of a pixel is within a predetermined range, a bit for the pixel is set to "on", otherwise the bit is set to "off". For example, if the following conditions are satisfied, the bit for the pixel is set to "on".

$$RedMax \geq R \geq RedMin,$$

$$GreenMax \geq G \geq GreenMin,$$

and $$BlueMax \geq B \geq BlueMin,$$

wherein R, G and B represents pixel values of red, green and blue of an object pixel, RedMax, GreenMax, and BlueMax represent upper limits of R, G and B, and RedMin, GreenMin, and BlueMin represent lower limits of R, G and B. Next, in order to process the data more efficiently, the resolution (degree of fineness of image) of the image data as the object of the recognition is decreased to a lower but sufficient resolution for the image analysis (S144).

Next, in order to detect the specified pattern (for example, a circular patter of a predetermined size), the bi-level image is scanned with a filter successively, and the specified pattern is detected with pattern matching (S146). Then, based on the result of the pattern matching, it is decided whether output of the image is permitted or not (S148). If the degree of matching with the specified pattern is large, it is decided to inhibit the output of the image.

Figure 5:
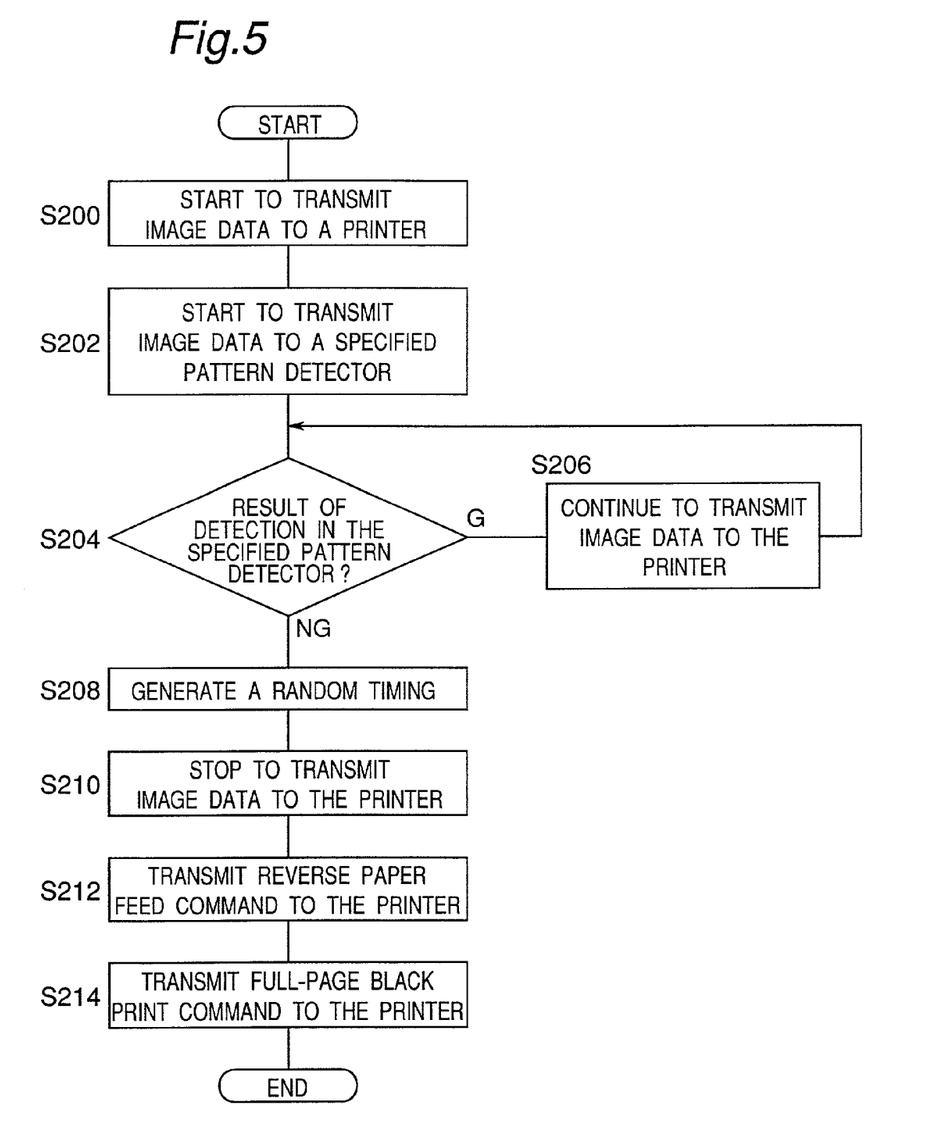
FIG. 5 is a flowchart of a printer driver in a second embodiment.

Next, a system of a second embodiment is explained. In the above-mentioned first embodiment, the print stop instruction is transmitted at a timing given by the print stop block. On the other hand, in this embodiment, a print stop block 122 not only stop the print operation, but after receiving the print stop instruction, it makes the printer feed the paper reversely (or backward) and print with a different color to the end of the paper so as to make the stop position uncertain. FIG. 5 shows a flow of the printer driver 120. The processing until the stop of the transmission of image data to the printer 7 (S210) is similar to the counterpart in the first embodiment. Next, a paper reverse feed command is transmitted to the printer 7 (S212). Next, a full black paint command is sent to the printer 7 (S214). Thus, the printer 7 paints black color uniformly over the entire sheet. It is also possible to use an ink of a color remaining most at the time. It is also possible to print not the whole sheet uniformly, but only a portion thereof as far as it is not apparent at what position the printing of the image is stopped.

Figure 6:
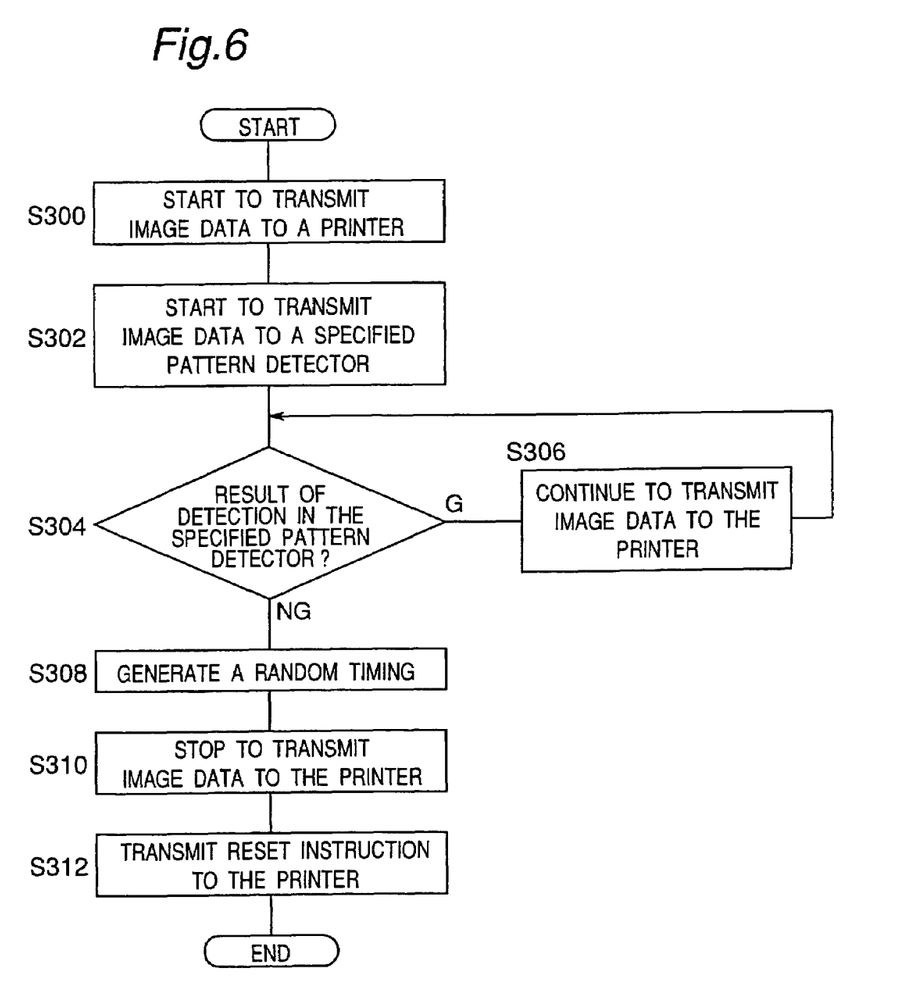
FIG. 6 is a flowchart of a printer driver in a third embodiment.

Next, a print system of a third embodiment is explained. In this embodiment, when a specified pattern is detected, a print stop block not only stops the printing at a random timing, but also it sends a reset signal to the printer 7 in order to destroy the data in the buffer in the printer 7. FIG. 6 shows a flow of the printer driver 120 in this embodiment. The processing until the stop of transmission of image data to the printer 7 (S310) is similar to the counterpart in the first embodiment shown in FIG. 3. After the stop of transmission of image data, a reset command is transmitted to the printer 7 (S312). The printer 7 monitors a reset signal constantly, and when a reset signal is received, it clears the data in the buffer in the printer 7 instantly and stops the print operation.

Figure 7:
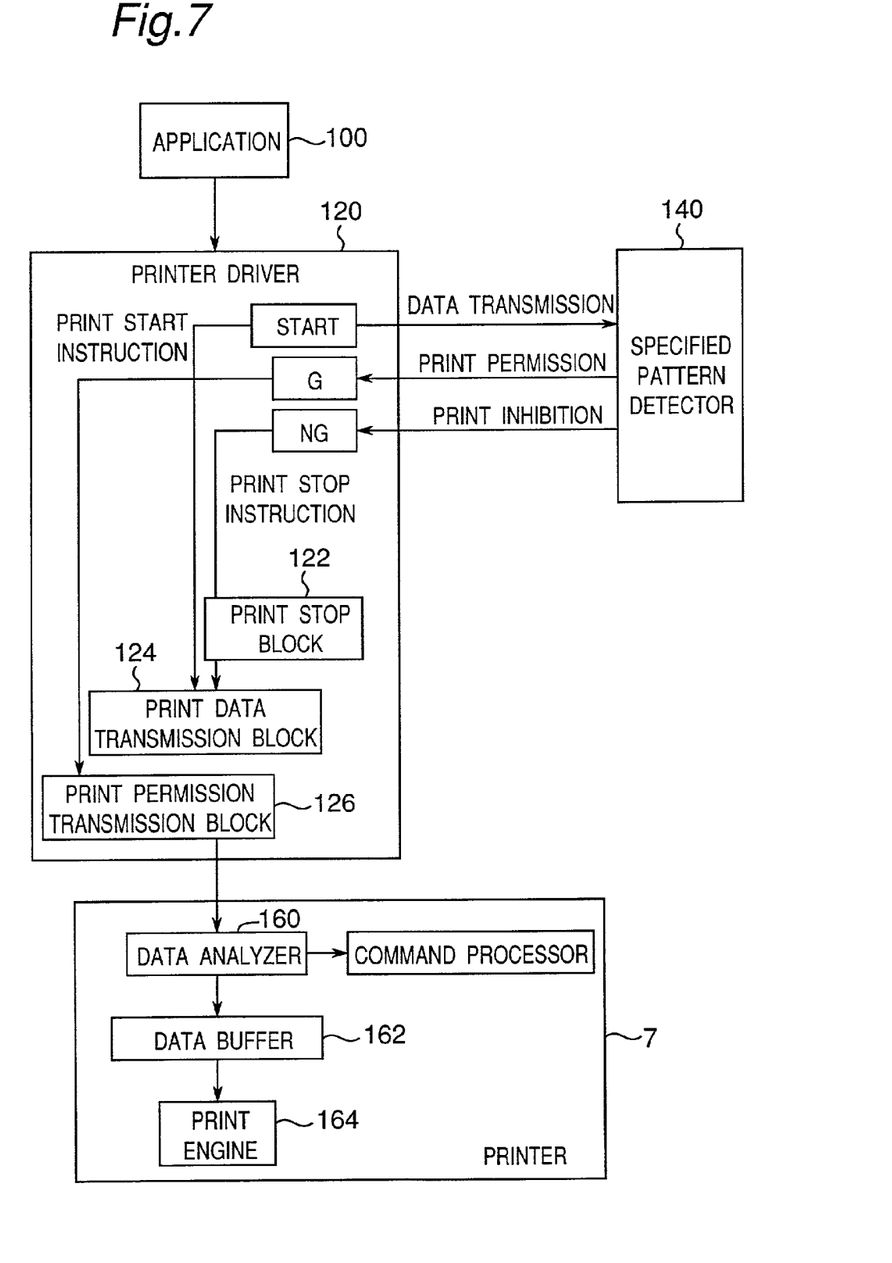
FIG. 7 is a diagram of a flow of print data processing in a fourth embodiment.

Next, a print system of a fourth embodiment is explained. In this system, as shown in FIG. 7, when the printer 7 receives image data, a data analyzer 160 in the printer 7 analyzes the image data, and stores it in a data buffer 162 after processing the command. When a print permission transmission block 126 in the printer driver 120 sends a print permission command, the printer 7 sets a print permission flag on the data in the data buffer 162 and performs print operation in a print engine 164. In the first embodiment explained above, the print stop instruction is sent at a timing set by the print stop block 122. On the other hand, in this embodiment, after the printing is stopped, a reset signal is further sent to the printer 7, so that the data in the data buffer 162 in the printer 7 is also cleared. The printer 7 monitors the reset signal and the print permission signal constantly, and when the reset signal is received, it clears the data in the buffer 162 in the printer 7 instantly and stops the print operation. In correspondence to the print permission signal, a print permission flag on the data in the data buffer 162 is set. However, because the print data is not started to be printed until the print permission signal is received, the print permission signal may cause a problem on performance. Therefore, it is desirable that the command is sent in the unit of page.

Figure 8:
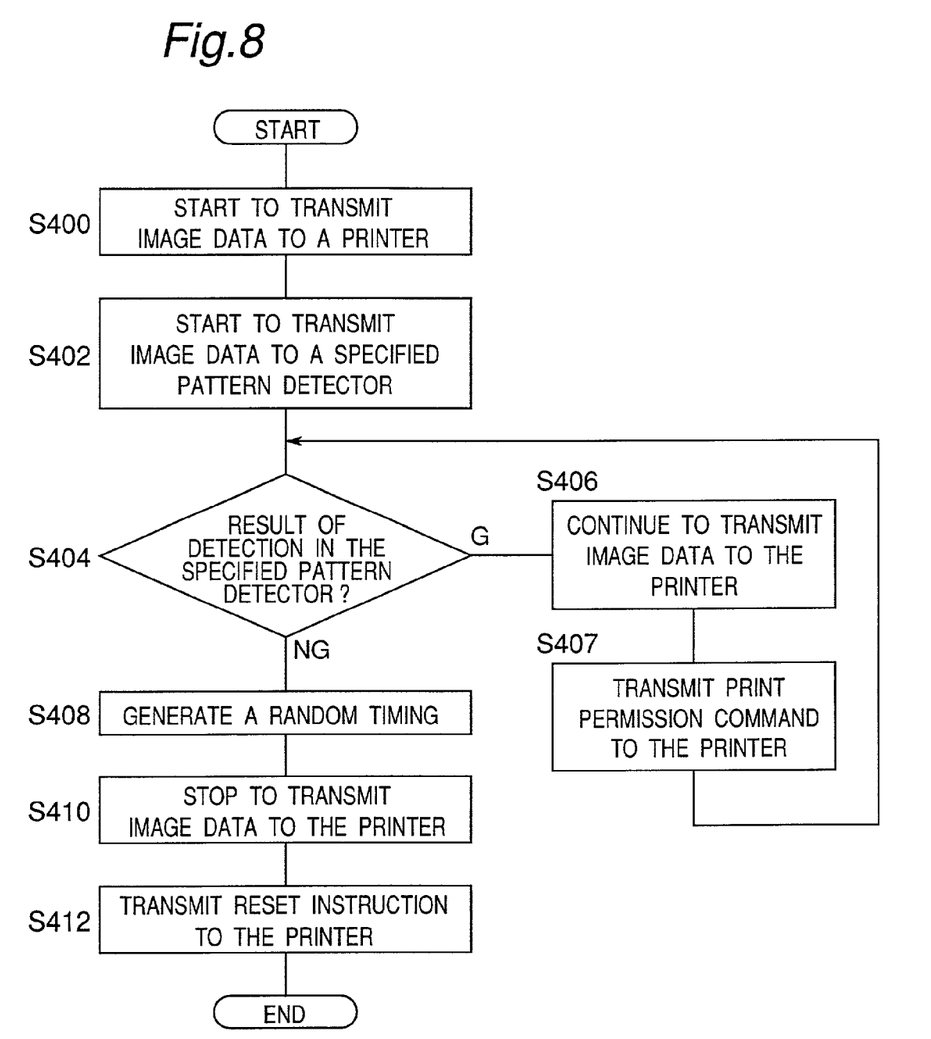
FIG. 8 is a flowchart of a printer driver in the forth embodiment.

FIG. 8 shows a flow of the printer driver 120 in this embodiment. This flow is different from the counterpart in the third embodiment only after the transmission of image data to the printer 7 is continued (S406). After step S406, a print permission command is sent to the printer 7 (S407).

Figure 9:
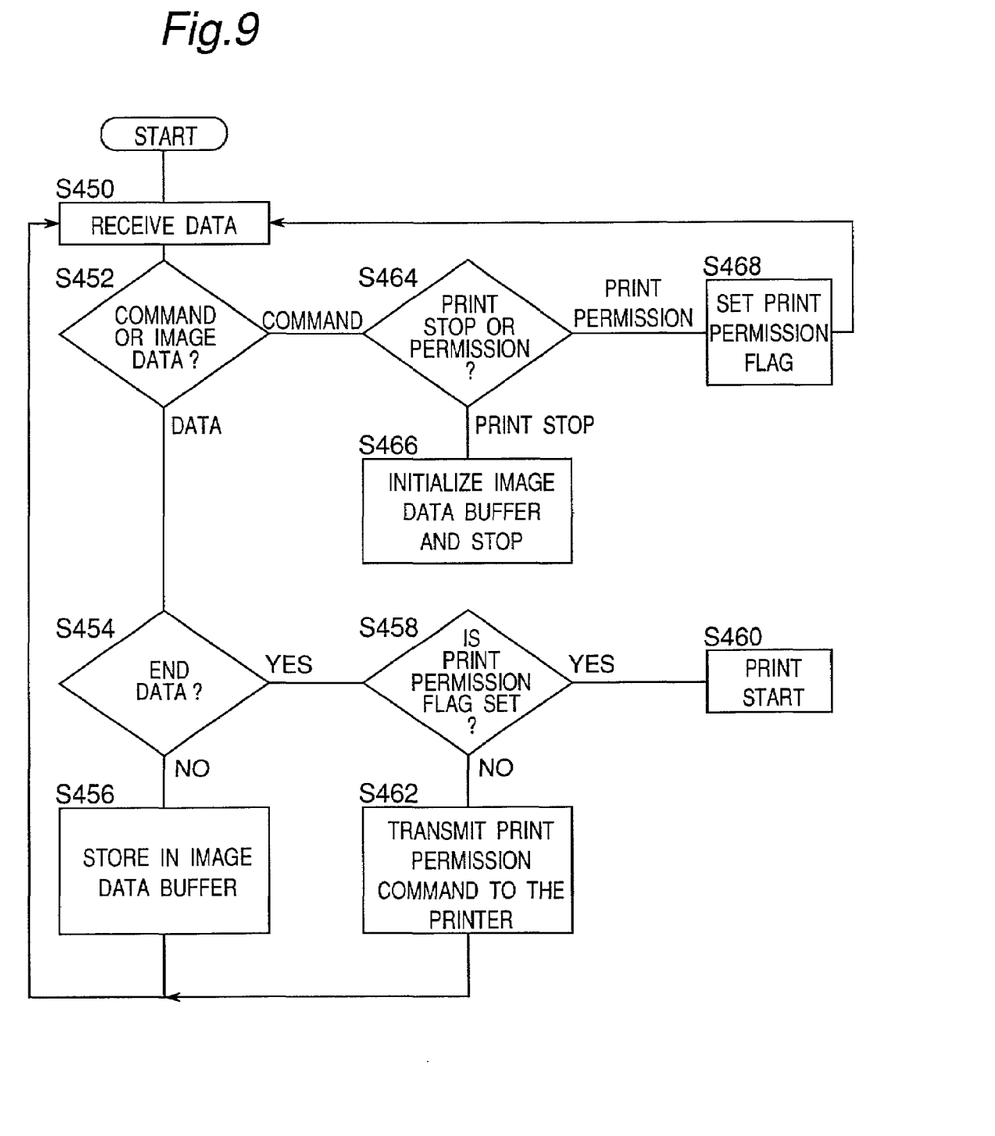
FIG. 9 is a flowchart of control of a printer.

FIG. 9 shows a flow of the control in the printer 7. When input data is received (S450), it is decided whether the input data is a command or an image data (S452). If the input data is an image data, it is decided next whether it is an end data or not (S454). If the image data is not the end data, it is stored in the image data buffer (S456), and the flow returns to step S450 to wait a next data. If the image data is the end data, it is decided next whether the print permission flag is set or not (S458). If the print permission flat is set, the print operation is started (S460). If the print permission flag is not set, a print permission command is sent to the printer (S462), and the flow returns to step S450. If the input data is a command, it is decided next whether the command is a print stop command or a print permission command (S664). If the command is a print stop command, the image buffer is initialized, and the print operation is stopped (S466). If the command is a print permission command, the print permission flag is set (S468), and the flow returns to step S450.

Next, a print system of a fifth embodiment is explained. The buffer for image data is provided in the printer 7 in the above-mentioned fourth embodiment. In this embodiment, a data buffer is provided in the printer driver 120 or in the specified pattern detector 140. That is, data are pooled in the printer driver 120 until a print permission command is received from the specified pattern detector 140. When a print inhibition command is issued, the data in the buffer is cleared instantly. When a print permission command is issued, the data is sent to the printer 7. However, because the print data is not started to be printed until the print permission signal is received, the print permission signal may cause a problem on performance. Therefore, it is also desirable in this embodiment that the command is sent in the unit of page.

This type of technique for preventing forgery is a matter when a high precision color image is outputted, and the detection of a specified pattern accompanies a minimum overhead. Therefore, the specified pattern detector 140 may be operated only for data of a full color image. Further, it may be operated only for printing with high resolution of 400 dpi or higher.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A print system including an image processor and a printer which prints data received from said image processor;
   wherein said image processor comprises:
   an output device which processes input data and outputs the processed data;
   a detector which detects whether data of a specified pattern is included in the input data, in parallel to the data processing by said output device; and
   a stop controller which makes said output device stop to output the processed data at an irregular timing after said detector detects the specified pattern;
   wherein said printer prints an image on a sheet of paper, based on the data outputted by said output device; and
   a timing generator which generates a random timing, wherein said stop controller makes said output device stop to output the processed data at the timing generated by said timing generator after said detector detects the specified pattern.

2. The print system according to claim 1, said image processor further comprising a transmitter which transmits a reset signal for clearing data stored in a buffer in the printer when the specified pattern is detected by said detector.

3. An image processor comprising:
   an output device which processes input data and outputs the processed data;
   a detector which detects whether data of a specified pattern is included in the input data, in parallel to the data processing by said output device; and
   a stop controller which makes said output device stop to output the processed data at an irregular timing after said detector detects the specified pattern; and
   a timing generator which generates a random timing, wherein said stop controller makes said output device stop to output the processed data at the timing generated by said timing generator after said detector detects the specified pattern.

4. The image processor according to claim 3, further comprising:
   a memory device which stores the input data or the processed data.

5. The image processor according to claim 3, wherein said output device outputs the processed data to a printer which prints an image on a sheet of paper.

6. The image processor according to claim 5, further comprising a transmitter which transmits a reset signal to clear data stored in a buffer in the printer when the specified pattern is detected by said detector.

7. A computer readable storage medium storing a computer-executable program comprising the steps of:
   processing input data and outputs the processed data; and
   detecting whether a specified pattern is included in the input data, in parallel to the data processing of the input data;
   wherein the output of the processed data is stopped at an irregular timing when the specified pattern is detected; and
   the step of generating a random timing, wherein the processed data is stopped to be outputted at the random timing after said detector detects the specified pattern.

8. The storage medium according to claim 7, wherein in said processing step the processed data is outputted to a printer.

9. A method of image processing comprising the steps of:
   processing input data and outputting the processed data;
   generating a random timing; and
   detecting whether a specified pattern is included in the input data or, in parallel to the data processing of the input data;
   wherein the output of the processed data is stopped at the generated timing after the specified pattern is detected.

10. An image processor comprising:
    an output device which processes input data and outputs the processed data;
    a detector which detects whether data of a specified pattern is included in the input data, in parallel to the data processing by said output device; and in parallel to the data processing by said output device; and
    a stop controller which makes said output device stop to output the processed data at an irregular timing after said detector detects the specified pattern; and
    a transmitter which transmits a command signal to the printer for feeding a sheet of paper reversely on which an image is formed based on the processed data when the specified pattern is detected by said detector;

wherein said output device outputs the processed data to a printer which prints an image on a sheet of paper.

11. A print system including an image processor and a printer which prints data received from said image processor;

wherein said image processor comprises:

an output device which processes input data and outputs the processed data;

a detector which detects whether data of a specified pattern is included in the input data, in parallel to the data processing by said output device; and a stop controller which makes said output device stop to output the processed data at an irregular timing after said detector detects the specified pattern;

wherein said printer prints an image on a sheet of paper, based on the data outputted by said output device; and a transmitter which transmits a command signal to the printer for feeding a sheet of paper reversely on which an image is formed based on the processed data when the specified pattern is detected by said detector, said printer further comprising a feeder which feeds a sheet of paper reversely in the middle of printing in response to the command signal received from said transmitter.

12. The print system according to claim 11, wherein said printer prints on the sheet which has been fed reversely with a specified color different from that of a document image after feeding the sheet of paper reversely.

* * * * *